US00RE43808E

(19) United States
(12) Reissued Patent
Lyle, Jr. et al.

(10) Patent Number: US RE43,808 E
(45) Date of Reissued Patent: *Nov. 20, 2012

(54) PHASE SHIFT MODULATION-BASED CONTROL OF AMPLITUDE OF AC VOLTAGE OUTPUT PRODUCED BY DOUBLE-ENDED DC-AC CONVERTER CIRCUITRY FOR POWERING HIGH VOLTAGE LOAD SUCH AS COLD CATHODE FLUORESCENT LAMP

(75) Inventors: Robert L. Lyle, Jr., Raleigh, NC (US); Steven P. Laur, Raleigh, NC (US); Zaki Moussaoui, Palm Bay, FL (US)

(73) Assignee: Intersil Americas Inc., Milpitas, CA (US)

( * ) Notice: This patent is subject to a terminal disclaimer.

(21) Appl. No.: 12/547,882

(22) Filed: Aug. 26, 2009

Related U.S. Patent Documents

Reissue of:
(64) Patent No.: 7,368,880
Issued: May 6, 2008
Appl. No.: 11/046,976
Filed: Jan. 31, 2005

U.S. Applications:
(60) Provisional application No. 60/589,172, filed on Jul. 19, 2004.

(51) Int. Cl.
*H05B 41/16* (2006.01)

(52) U.S. Cl. ..... 315/247; 315/224; 315/276; 315/307

(58) Field of Classification Search ..... 315/194, 315/209 R, 219–221, 223–226, 246–247, 315/274–277, 283, 291, 307
See application file for complete search history.

(56) References Cited

U.S. PATENT DOCUMENTS

| | | | | |
|---|---|---|---|---|
| 2,786,967 | A * | 3/1957 | Kuenning | 315/163 |
| 3,091,720 | A * | 5/1963 | Huberty | 315/98 |
| 5,187,411 | A | 2/1993 | Boyd et al. | |
| 5,434,477 | A * | 7/1995 | Crouse et al. | 315/209 R |
| 5,559,395 | A | 9/1996 | Venkitasubrahmanian et al. | |
| 5,604,409 | A | 2/1997 | Fisher | |
| 5,615,093 | A | 3/1997 | Nalbant | |
| 5,859,505 | A | 1/1999 | Bergman et al. | |
| 5,923,129 | A | 7/1999 | Henry | |
| 5,930,121 | A | 7/1999 | Henry | |
| 5,932,976 | A | 8/1999 | Maheshwari et al. | |

(Continued)

FOREIGN PATENT DOCUMENTS

| | | |
|---|---|---|
| CN | 1421838 | 6/2003 |

(Continued)

*Primary Examiner* — Tung X Le
(74) *Attorney, Agent, or Firm* — Fogg & Powers LLC

(57) ABSTRACT

A double-ended, DC-AC converter supplies AC power to a load, such as a cold cathode fluorescent lamp used to backlight a liquid crystal display. First and second converter stages generate respective first and second sinusoidal voltages having the same frequency and amplitude, but having a controlled phase difference therebetween. By employing a voltage controlled delay circuit to control the phase difference between the first and second sinusoidal voltages, the converter is able to vary the amplitude of the composite voltage differential produced across the opposite ends of the load. The converter may be either voltage fed or current fed.

44 Claims, 6 Drawing Sheets

U.S. PATENT DOCUMENTS

| | | | | |
|---|---|---|---|---|
| 5,945,785 | A | 8/1999 | Kido et al. | |
| 5,963,443 | A * | 10/1999 | Mihara | 363/134 |
| 6,057,652 | A | 5/2000 | Chen et al. | |
| 6,114,814 | A | 9/2000 | Shannon et al. | |
| 6,194,840 | B1 | 2/2001 | Chang | |
| 6,198,234 | B1 | 3/2001 | Henry | |
| 6,225,751 | B1 * | 5/2001 | Komatsu | 315/209 R |
| 6,326,740 | B1 | 12/2001 | Chang et al. | |
| 6,396,722 | B2 | 5/2002 | Lin | |
| 6,396,975 | B1 | 5/2002 | Wood et al. | |
| 6,417,631 | B1 * | 7/2002 | Chen et al. | 315/291 |
| 6,429,604 | B1 | 8/2002 | Chang | |
| 6,570,344 | B2 * | 5/2003 | Lin | 315/224 |
| 6,646,392 | B2 * | 11/2003 | Slegers | 315/291 |
| 6,815,906 | B1 * | 11/2004 | Aarons et al. | 315/209 R |
| 6,864,645 | B2 * | 3/2005 | Sun et al. | 315/308 |
| 6,936,975 | B2 | 8/2005 | Lin et al. | |
| 6,954,364 | B2 | 10/2005 | Min | |
| 6,965,204 | B2 * | 11/2005 | Langeslag | 315/209 R |
| 7,030,568 | B2 | 4/2006 | Boke et al. | |
| 7,075,245 | B2 | 7/2006 | Liu | |
| 7,075,247 | B2 | 7/2006 | Lyle, Jr. et al. | |
| 7,119,495 | B2 | 10/2006 | Jang | |
| 7,126,289 | B2 | 10/2006 | Lin et al. | |
| 7,187,139 | B2 | 3/2007 | Jin | |
| 7,560,872 | B2 | 7/2009 | Lyle, Jr. et al. | |
| 2003/0085669 | A1 | 5/2003 | Pak | |
| 2003/0099122 | A1 | 5/2003 | Cho | |
| 2004/0183465 | A1 * | 9/2004 | Jang | 315/224 |
| 2004/0232853 | A1 | 11/2004 | Hur et al. | |
| 2004/0263092 | A1 * | 12/2004 | Liu | 315/247 |
| 2005/0017803 | A1 | 1/2005 | Jonkman | |
| 2005/0062436 | A1 * | 3/2005 | Jin | 315/244 |
| 2005/0093471 | A1 | 5/2005 | Jin | 315/177 |
| 2005/0093472 | A1 | 5/2005 | Jin | 315/177 |
| 2005/0219863 | A1 | 10/2005 | Fukumoto et al. | |
| 2005/0225261 | A1 | 10/2005 | Jin | 315/255 |
| 2005/0225514 | A1 | 10/2005 | Ahn et al. | |
| 2006/0012312 | A1 | 1/2006 | Lyle, Jr. et al. | |
| 2006/0170371 | A1 | 8/2006 | Lyle, Jr. et al. | |
| 2006/0170378 | A1 | 8/2006 | Lyle, Jr. et al. | |

FOREIGN PATENT DOCUMENTS

| | | |
|---|---|---|
| JP | 2004241136 | 8/2004 |
| WO | 03001550 | 1/2003 |
| WO | WO2005/038828 | 10/2004 |
| WO | WO2005/101920 | 4/2005 |

* cited by examiner

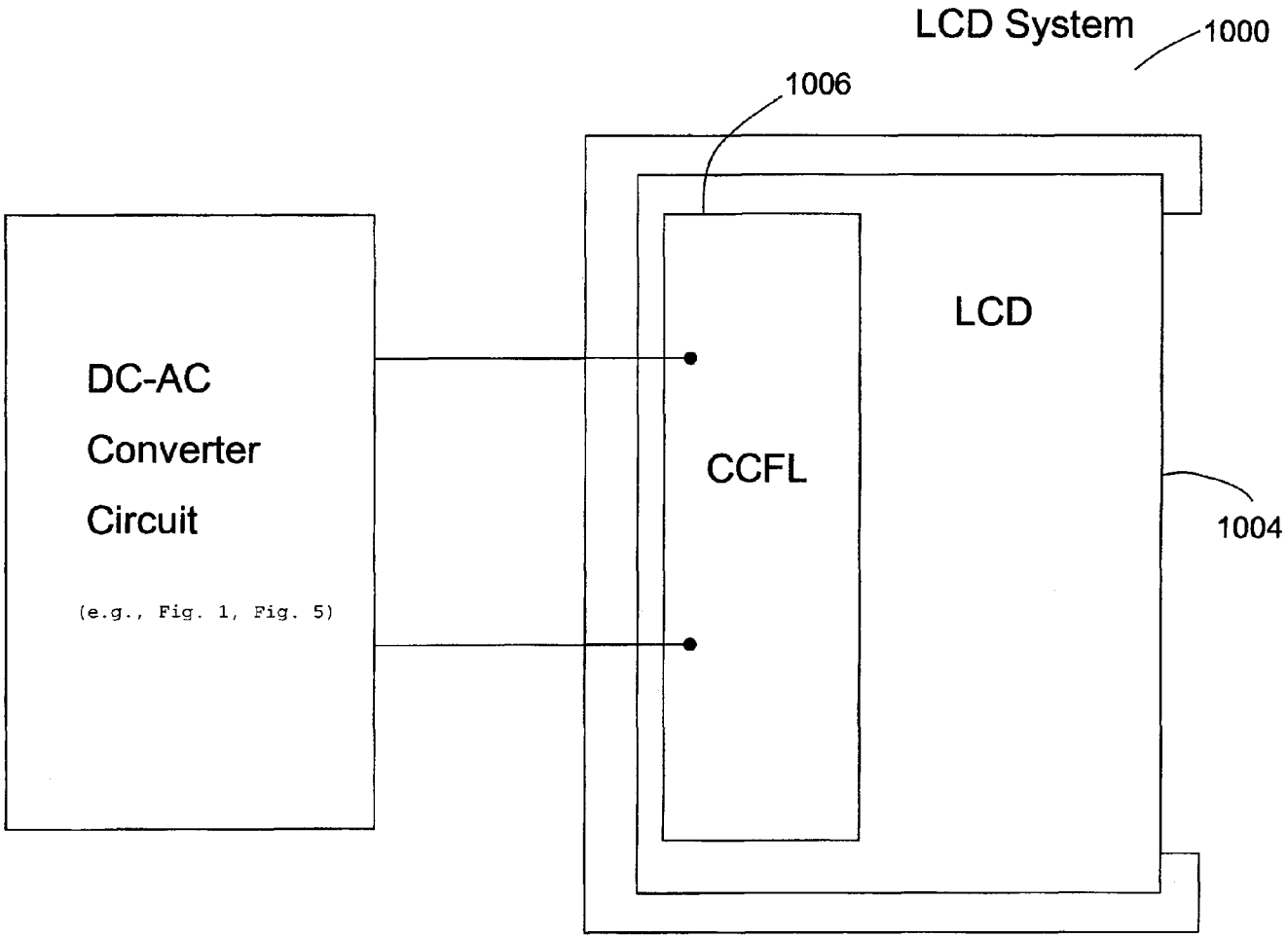
(New)
Fig. 10

PHASE SHIFT MODULATION-BASED CONTROL OF AMPLITUDE OF AC VOLTAGE OUTPUT PRODUCED BY DOUBLE-ENDED DC-AC CONVERTER CIRCUITRY FOR POWERING HIGH VOLTAGE LOAD SUCH AS COLD CATHODE FLUORESCENT LAMP

Matter enclosed in heavy brackets [ ] appears in the original patent but forms no part of this reissue specification; matter printed in italics indicates the additions made by reissue.

CROSS-REFERENCE TO RELATED APPLICATION

The present application claims the benefit of previously filed, co-pending U.S. patent application Ser. No. 60/589,172, filed Jul. 19, 2004, by R. Lyle et al, entitled: "Phase Shift Modulation for Double Ended, Push Pull Inverter," assigned to the assignee of the present application and the disclosure of which is incorporated herein.

FIELD OF THE INVENTION

The present invention relates in general to power supply systems and subsystems thereof, and is particularly directed to a method and apparatus for controlling the amplitude of an AC voltage supplied to a high voltage device, such as a cold cathode fluorescent lamp of the type employed for back-lighting a liquid crystal display.

BACKGROUND OF THE INVENTION

There are a variety of electrical system applications which require one or more sources of high voltage AC power. As a non-limiting example, a liquid crystal display (LCD), such as that employed in desktop and laptop computers, or in larger display applications such as large scale television screens, requires an associated set of cold cathode fluorescent lamps (CCFLs) mounted directly behind it for back-lighting purposes. In these and other applications, ignition and continuous operation of the CCFLs require the application of a high AC voltage that can range on the order of several hundred to several thousand volts. Supplying such high voltages to these devices has been customarily accomplished using one of several methodologies.

A first approach involves the use a single-ended drive system, wherein a high voltage AC voltage generation and control system is transformer-coupled to one/near end of the lamp, while the other/far end of the lamp is connected to ground. This technique is undesirable, as it involves the generation of a very high peak AC voltage in the high voltage transformer circuitry feeding the driven end of the lamp.

Another approach involves the use a double-ended drive system, wherein a high voltage AC voltage generation and control system is transformer-coupled to one/near end of the lamp, while connection from the voltage generation and control system to the other/far end of the lamp is effected through high voltage wires. These wires can be relatively long (e.g., four feet or more), and are more expensive than low voltage wires; in addition, they lose substantial energy through capacitive coupling to ground.

Another approach is to place a high voltage transformer and associated voltage switching devices, such as MOSFETs or bipolar transistors, near the far end of the lamp; these devices are connected to and controlled by a local controller at the near end of the lamp. This approach has disadvantages similar to the first, in that the gate (or base) drive wires are required to carry high peak currents and must change states at high switching speeds for efficient operation. The long wires required are not readily suited for these switching speeds, due their inherent inductance; in addition they lose energy because of their substantial resistance.

SUMMARY OF THE INVENTION

In accordance with the present invention, disadvantages, such as those described above, of conventional high voltage AC power supply system architectures, including systems for supplying AC power to CCFLs used to back-light an LCD panel, are effectively obviated *in system 1000 of FIG. 10* by a double-ended, DC-AC converter architecture (*FIGS. 1 and 5*), which is operative to drive opposite ends of a load, such as a CCFL *1006*, with a first and second sinusoidal voltages having the same frequency and amplitude, but having a controlled phase difference therebetween. By controlling the phase difference between the first and second sinusoidal voltages, the present invention is able to vary the amplitude of the composite voltage differential produced across the opposite ends of the load.

A first, voltage-fed embodiment comprises first and second, push-pull DC-AC converter stages, respective output ports of which are coupled to opposite ends of a load, such as but not limited to a cold cathode fluorescent lamp (CCFL). Each of the converter stages contains a pair of pulse generators which produce phase-complementary rectangular wave pulse signals of the same amplitude and frequency having a 50% duty cycle. These phase-complementary pulse signals are used to control the ON/OFF conduction of a pair of controlled switching devices, such as respective MOSFETs, whose source-drain paths are coupled between a reference voltage terminal (e.g., ground) and opposite ends of a center-tapped primary coil of a step-up transformer. The center tap of the primary coil of the step-up transformer is coupled to a DC voltage source, which serves as the DC voltage feed for that DC-AC converter stage. The secondary coil of the step-up transformer has a first end coupled to a reference voltage (e.g., ground) and a second end coupled by way of an RLC output filter to one of the two output ports. The RLC circuit converts the generally rectangular wave output produced across the secondary winding of the step-up transformer into a generally sinusoidal waveform.

The operation of a respective push-pull DC-AC converter stage is as follows. The complementary phase, rectangular waveform, 50% duty cycle output pulse trains produced by the two pulse generators will alternately turn the two MOSFETs on and off, in a mutually complementary manner, such that, as one MOSFET is turned on, the other MOSFET will be turned off, and vice versa. Whichever MOSFET is turned on will provide a current flow path to ground from the voltage source feed through half of the center tapped primary winding and the drain-source path of that MOSFET. The alternating of the conduction cycles of the two MOSFETs of a respective converter stage has the effect of producing a generally rectangular output pulse waveform having a 50% duty cycle across the secondary winding of the step-up transformer for that stage. The amplitude of this voltage waveform corresponds to the product of the secondary:primary turns ratio of the transformer and twice the value of the DC voltage of the voltage feed source. As pointed out above, the shape of this generally rectangular waveform is converted by the RLC filter into a relatively well defined sinusoidal waveform, that is supplied to one of the two output ports.

In accordance with the controlled phase shift mechanism of the present invention, the phase of the sinusoidal waveform produced by the output RLC filter of one of the converter stages is controllably shifted by a prescribed amount relative to the phase of the sinusoidal waveform produced by the output RLC filter of the other converter stage. This controlled imparting of a differential phase shift between the sinusoidal waveforms appearing at the two output ports has the effect of modifying the shape and thereby the amplitude of the composite AC signal produced between the two output ports.

At a first extreme, where the two sinusoidal waveforms are exactly 180° out of phase with each other, the differential waveform imparted across the load is a sinusoidal waveform of twice the amplitude of each of the individual sinusoidal waveforms produced at the two output ports. At the other extreme, where the two waveforms produced by the two push-pull DC-AC converter stages are exactly in-phase, the differential across output ports produces a net DC voltage of zero volts amplitude. For incremental phase offsets between the two extreme values of 0° and 180°, the two waveforms produced by push-pull DC-AC converter stages are incrementally offset in phase, which serves to vary or modulate the amplitude of the composite waveform produced across output terminals.

In accordance with a non-limiting, but preferred embodiment of the invention, producing the incremental phase offsets between the two waveforms generated by the two converter stages is readily accomplished by imparting a controlled amount of delay to the pulse trains produced by the pulse generators of one of the converter stages relative to the pulse trains produced by pulse generators of the other converter stage. The amount of delay between the two pulse trains will control the shape and thereby the amplitude of the composite AC waveform produced across the output ports.

A second, current-fed embodiment of the invention comprises first and second, current-fed, push-pull DC-AC converter stages respective output ports of which are coupled to opposite ends of a load such as a CCFL, as in the first embodiment. As in the first embodiment, the current-fed, double ended push-pull, DC-AC converter stages are operative to produce first and second sinusoidal voltages having the same frequency and amplitude, but having a controlled phase difference therebetween, which is effective to modulate the amplitude of the composite AC voltage produced across the opposite ends of the load.

For this purpose, as in the first embodiment, each current-fed, converter stage has a pair of complementary pulse generators, which produce phase-complementary rectangular output pulse signals having a 50% duty cycle. Each rectangular wave signal is applied to the control terminal of a controlled switching device, such a controlled relay, which is operative to controllably interrupt a current flow path therethrough coupled between a prescribed reference voltage (e.g., ground) and one end of a parallel connection of a capacitor and a center-fed primary winding of a step-up transformer, which form a resonant tank circuit, that serves to deliver a resonant sinusoidal waveform of a fixed frequency and amplitude to the secondary winding of the transformer. The primary winding of the step-up transformer has its center tap coupled through a resistor and an inductor to a DC voltage source, which serves as the current feed for that converter stage.

The operation of each current-fed, converter stage is as follows. The complementary phase, rectangular waveform 50% duty cycle output pulse trains produced by the pair of pulse generators will alternately close and open the controlled switches in a complementary manner. Whenever a switch is closed, a current flow path is established from the battery terminal though an inductor and resistor to the center tap of the transformer's primary winding, and therefrom through half of the primary winding, a resistor and the closed current flow path through the switch to ground. A prescribed time after the closure of one switch and the opening of the other switch, the states of the two pulse signal inputs to the control inputs of switches are reversed. Due to the inductance of the transformer's primary winding, current therethrough does not immediately cease flowing. Instead, current from the primary winding flows into one side of the capacitor connected in parallel with the primary winding.

The resonant circuit formed by the capacitor and the primary of the step-up transformer results in a ringing of the current between the capacitor and the primary winding of the transformer, which serves to induce a sinusoidal waveform across the secondary winding. The waveform on one side of the resonant tank capacitor is a one-half positive polarity sine wave, while the waveform on the other side of the capacitor is a one-half negative polarity sine wave. The resultant of the two one-half sine waves, which is applied to one of the output ports, is a sine wave of fixed amplitude, frequency and phase.

In order to controllably shift the phase of the resultant sine wave supplied to the one output port relative to the other output port, transitions in the complementary 50% duty cycle pulse trains produced by the pulse generators of one converter stage are incrementally delayed with respect to the pulse trains produced by the pulse generators of the other stage, so as to controllably shift the phase of the sine wave supplied to the one output port relative to the other output port. As in the voltage-fed embodiment, incrementally offsetting in phase of the two sine waveforms produced by the push-pull DC-AC converter stages of the current-fed embodiment serves to vary or modulate the amplitude of the composite waveform produced across the two output terminals.

A voltage controlled delay circuit is used to define the relative delay between the complementary pulse trains that are applied to the pulse generators within the respective push-pull DC-AC converter stages of the embodiments of the invention, and thereby control the amplitude of the composite AC waveform produced across the driven load. In accordance with a non-limiting example, the voltage controlled delay circuit may include an edge detector, which is coupled to receive a digital clock signal of a prescribed frequency associated with the intended operation of the DC-AC converter. The output of the edge detector is coupled to the toggle input of a first toggle flip-flop and to an edge input of a voltage controlled one-shot. The first toggle flip-flop has its Q and QBAR outputs respectively coupled to the control inputs of the pair of switches of one of the converter stages.

The voltage-controlled one-shot has a voltage control input which is coupled to receive a DC voltage that sets the delay through the one-shot, as referenced to the signal edge applied to the edge input. The output of the one-shot is a replication of the edge signal produced by the edge detector, but delayed in time in proportion to the magnitude of the DC voltage applied to its voltage control input. The output of the one-shot is coupled to the toggle input of a second toggle flip-flop, which has its Q and QBAR outputs respectively coupled to the control inputs of the pair of switches of the other converter stage.

Incrementally varying the magnitude of the DC voltage applied to the voltage control input of the one-shot serves to controllably adjust the delay between the transitions in the complementary 50% duty cycle pulse trains produced by one pair of pulse generators with respect to the pulse trains produced by the other pair of pulse generators, so as to controllably shift the phase of the resultant sine wave supplied to one output port relative to the sine wave applied to the other output port. As described above, this serves to modulate the amplitude of the composite AC voltage produced across the opposite ends of the load.

BRIEF DESCRIPTION OF THE DRAWINGS

*FIG. 10 diagrammatically illustrates an example of a system incorporating a DC to AC controller and driver according to one embodiment of the current invention.*

DETAILED DESCRIPTION

Figure 1:
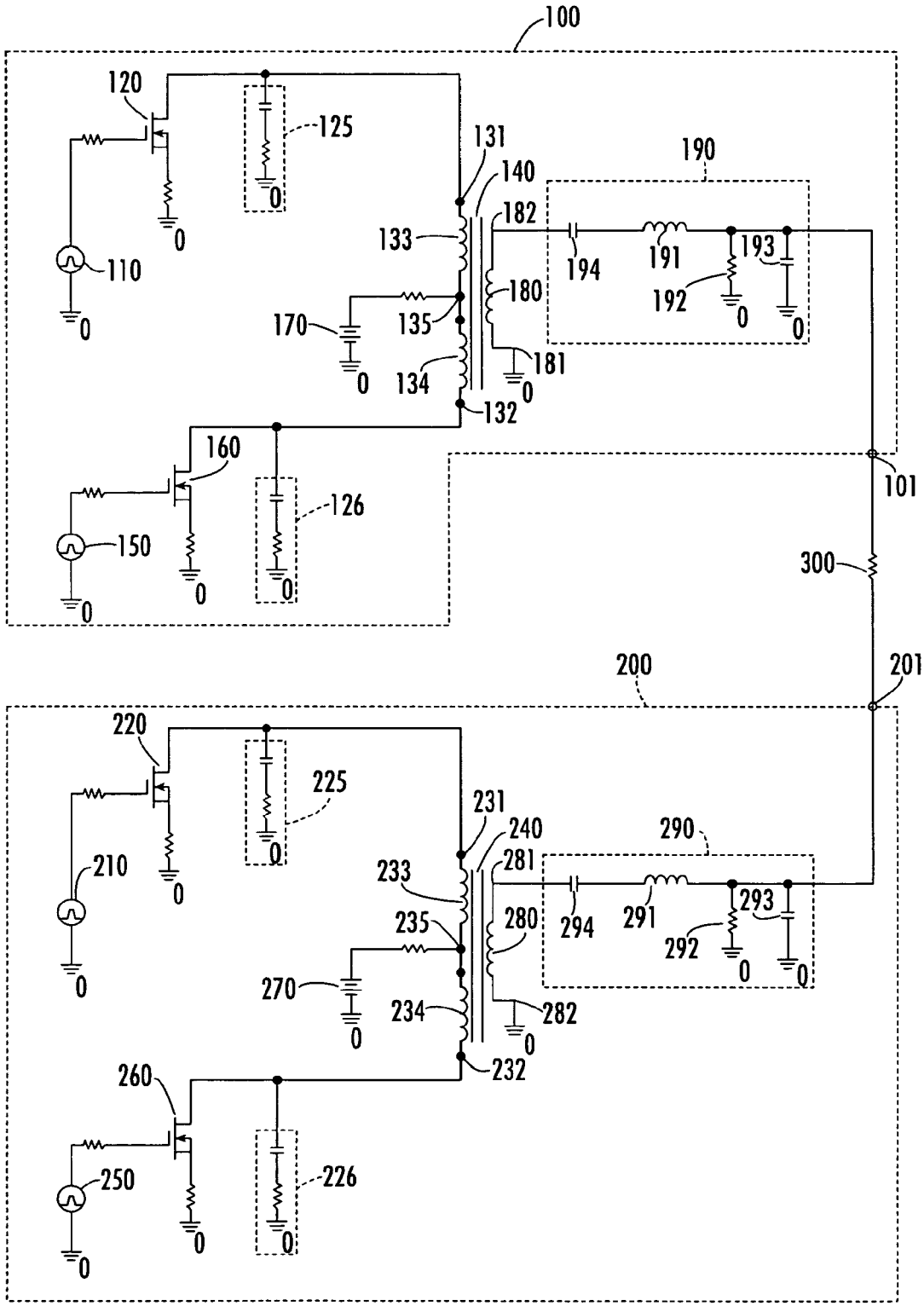
FIG. 1 diagrammatically illustrates first, voltage-fed embodiment of a DC-AC controller and driver architecture for a double-ended inverter arrangement for powering a load such as a cold cathode fluorescent lamp in accordance with the present invention.

Before detailing the double-ended, phase modulation-based DC-AC converter architecture of the present invention, it should be observed that the invention resides primarily in a prescribed novel arrangement of conventional controlled power supply circuits and components. Consequently, the configurations of such circuits and components and the manner in which they may be interfaced with a driven load, such as a cold cathode fluorescent lamp have, for the most part, been shown in the drawings by readily understandable schematic block diagrams, and associated waveform diagrams, which show only those specific aspects that are pertinent to the present invention, so as not to obscure the disclosure with details which will be readily apparent to those skilled in the art having the benefit of the description herein. Thus, the schematic block diagrams are primarily intended to show the major components of various embodiments of the invention in convenient functional groupings, whereby the present invention may be more readily understood.

Attention is now directed to FIG. 1, wherein a first embodiment of the present invention, in particular, a voltage-fed, double-ended, push-pull DC-AC converter, is schematically illustrated as comprising first and second, push-pull DC-AC converter stages 100 and 200, respective output ports 101 and 201 of which are coupled to opposite ends of a load 300, such as but not limited to a cold cathode fluorescent lamp (CCFL) *1006 in a system such as but not limited to that of system 1000 of FIG. 10*. As described briefly above, and as is detailed hereinbelow, the double ended push-pull, DC-AC converter stages 100 and 200 are operative to produce first and second AC voltages having the same frequency and amplitude, but having a controlled phase difference therebetween, which is effective to modulate the amplitude of the composite voltage produced across the opposite ends of the load.

More particularly, the first, push-pull DC-AC converter stage 100 comprises a first pulse generator 110, which produces an output pulse signal having a 50% duty cycle. This rectangular wave signal is applied to the control terminal of a controlled switching device, shown as a MOSFET 120, which has its source-drain path coupled between a prescribed reference voltage (e.g., ground) and a first end 131 of an upper half 133 of a center-tapped primary coil 130 of a step-up transformer 140. A high pass noise rejection RC filter 125 is coupled between the first end 131 of primary coil 130 and ground. Push-pull DC-AC converter stage 100 further includes a second pulse generator 150, which also produces an output pulse signal having a 50% duty cycle. In accordance with the invention, the 50% duty cycle, rectangular wave output of pulse generator 150 has the same frequency and amplitude as, but opposite phase relative to, the rectangular wave signal output of pulse generator 110.

The rectangular wave signal output of pulse generator 150 is applied to the control terminal of a controlled switching device, shown as a MOSFET 160, having its source-drain path coupled between a prescribed reference voltage (e.g., ground) and a second end 132 of a lower half 134 of a center-tapped primary coil 130 of step-up transformer 140. A high pass noise rejection RC filter 126 is coupled between the second end 132 of primary coil 130 and ground. With the signals produced by pulse generators 110 and 150 having the same amplitude and frequency, but being of opposite phase, whenever MOSFET switch 120 is turned on, MOSFET switch 160 is turned off, and whenever MOSFET switch 120 is turned off, MOSFET switch 160 is turned on. As will be described below this has the effect of producing a 50% duty cycle output pulse signal across the secondary winding 180 of transformer 140.

The primary coil 130 of step-up transformer 140 has its center tap 135 coupled to a DC voltage source 170 (e.g., having an amplitude on the order of 24 VDC), which serves as the DC voltage feed for the DC-AC converter. The secondary coil 180 of step-up transformer 140 has a first end 181 coupled to a reference voltage (e.g., ground) and a second end 182 coupled by way of an RLC output filter 190 to the first output port 101. The RLC circuit 190, which includes inductor 191, resistor 192, capacitor 193 and capacitor 194, serves to convert the generally rectangular wave output produced across the secondary winding 180 of transformer 140 into a generally sinusoidal waveform. Output port 101 is adapted to be coupled to one end of a high voltage load 300, such as a CCFL, as described above.

The operation of the first push-pull DC-AC converter stage 100 is as follows. The complementary phase, rectangular waveform 50% duty cycle output pulse trains produced by pulse generators 110 and 150 will alternately turn MOSFETs 120 and 160 on and off, such that, as described above, MOSFET switch 120 will be turned on, while MOSFET switch 160 is turned off, and MOSFET switch 120 will be turned off, while MOSFET switch 160 is turned on. Whenever MOSFET switch 120 is turned on (at which time MOSFET 160 switch is off, as described above), a current flow path from the voltage source feed 170 is provided through the upper half 134 of primary winding 130 and therefrom out the first end 131 of the upper half 133 of the primary winding 130 through the drain-source path of MOSFET switch 120 to ground. No current flow path is provided through the lower half 134 of the primary winding 130 at this time since MOSFET 160 is turned off.

In a complementary manner, whenever MOSFET switch 160 is turned on, a current flow path from the voltage source feed 170 is provided through the lower half 135 of primary winding 130 and therefrom out the second end 132 of primary winding 130 through the drain-source path of MOSFET switch 160 to ground. No current flow path is provided through the upper half 133 of the primary winding 130 at this time since MOSFET 120 is turned off.

Figure 2:
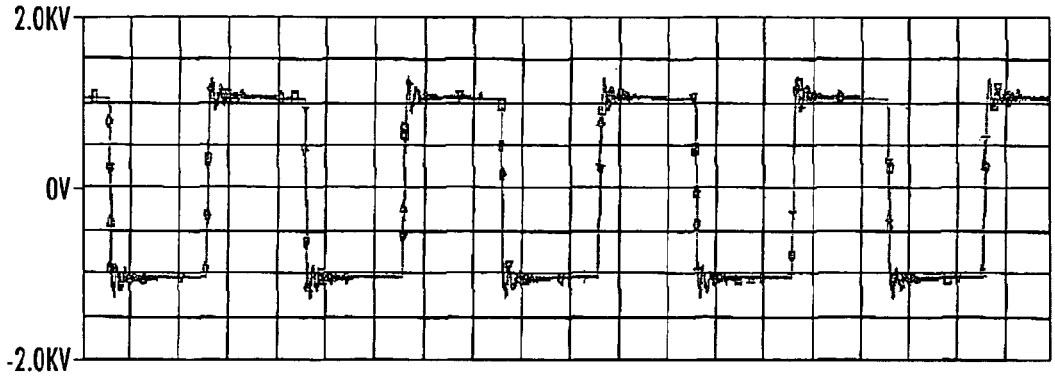
FIGS. 2-4 is a set of voltage waveforms associated with the operation of the embodiment of the invention depicted in FIG. 1.

As shown in the waveform diagram of FIG. 2, this alternating of the conduction cycles of the MOSFETs 120 and 160 has the effect of producing a generally rectangular output pulse waveform having a 50% duty cycle across the secondary winding 180 of transformer 140. The amplitude of this voltage waveform corresponds to the product of the secondary:primary turns ratio of the transformer 140 and twice the value of the DC voltage of voltage source 170. As pointed out above, the shape of this generally rectangular waveform is converted by the RLC filter 190 into a relatively well defined sinusoidal waveform, so that a first sinusoidal waveform is produced at output port 101.

The second push-pull DC-AC converter stage 200 is configured identically to converter stage 100. To this end, as shown in FIG. 1, DC-AC converter stage 200 includes a first pulse generator 210, which produces a generally rectangular output waveform having a 50% duty cycle. This signal is applied to the control terminal of a controlled switching device, shown as a MOSFET 220, having its source-drain path coupled between a prescribed reference voltage (e.g., ground) and a first end 231 of an upper half 233 of a center-tapped primary coil 230 of a step-up transformer 240. Push-pull DC-AC converter stage 200 further includes a second pulse generator 250, which also produces an output pulse signal having a 50% duty cycle. As in the case of converter stage 100, the 50% duty cycle pulse wave output of pulse generator 250 has the same frequency and amplitude as, but opposite phase relative to, the pulse signal output of pulse generator 210. The pulse signal output of pulse generator 250 is applied to the control terminal of a controlled switching device, shown as a MOSFET 260, having its source-drain path coupled between a prescribed reference voltage (e.g., ground) and a second end 232 of a lower half 234 of the center-tapped primary coil 230 of step-up transformer 240.

The primary coil 230 of step-up transformer 240 has its center tap 235 coupled to a DC voltage source 270 (which has the same voltage (e.g., 24 VDC)) as the DC voltage source feed 170 for the first converter stage. Step-up transformer 240 has a secondary output coil 280, a first end 281 of which is coupled to a reference voltage (e.g., ground) and the second end 282 of which is coupled by way of an RLC output filter 290 (comprised of inductor 291, resistor 292, and capacitors 293 and 294) to the second output port 201, that is adapted to be coupled to another end of the high voltage load (CCFL) 300.

The operation of the second push-pull DC-AC converter stage 200 is identical to the first, described above. Namely, as the opposite phase, 50% duty cycle output pulse trains produced by pulse generators 210 and 250 alternately switches MOSFETs 220 and 260 on and off, current alternately flows from the voltage source feed 270 through the respective upper and lower halves 234 and 235 of the transformer's primary winding, and the drain-source paths of the MOSFETS 220 and 260. Again, as shown in the waveform diagram of FIG. 2, this has the effect of producing a generally rectangular output pulse signal having a 50% duty cycle across the secondary winding 280 of transformer 240. Due to the presence of RLC circuit 290, the shape of this generally rectangular waveform is converted into a relatively well defined sinusoidal waveform, so that a second sinusoidal waveform is produced at output port 201.

In accordance with the controlled phase shift mechanism of the present invention, the phase of the sinusoidal waveform produced by output RLC filter 190 at the secondary winding 280 of step-up transformer 240 is controllably shifted by a prescribed amount relative to the phase of the sinusoidal waveform produced by RLC filter 290 at the output of the secondary winding 180 of step-up transformer 140. This controlled imparting of a differential phase shift between the sinusoidal waveforms appearing at output ports 101 and 201 has the effect of modifying the shape and thereby the amplitude of the composite AC signal produced between output ports 101 and 201, as illustrated in FIGS. 3 and 4.

Figure 3:
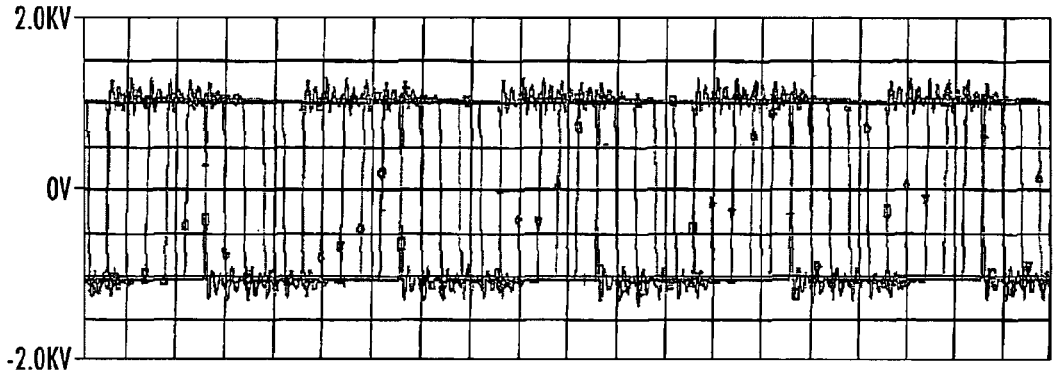

More particularly, FIG. 3 shows the effect of imparting successively increasing amounts of phase shift to the generally rectangular waveform produced at the output of secondary winding 280 of transformer 240 relative to the phase of the waveform produced at the output of the secondary winding 180 of transformer 140; FIG. 4 shows composite sinusoidal waveforms produced across output terminals as a result of the phase shifts of FIG. 3. From FIG. 4 it can be seen that, at a first extreme, where the two sinusoidal waveforms are exactly 180° out of phase with each other, the differential waveform imparted across the load 300 by way of output ports 101 and 201 is a sinusoidal waveform of twice the amplitude of each of the individual sinusoidal waveforms produced at output ports 101 and 201. At the other extreme, where the two waveforms produced by push-pull DC-AC converter stages 100 and 200 are exactly in-phase, the differential across output ports 101 and 201 produces a net DC voltage of zero volts amplitude.

Figure 4:
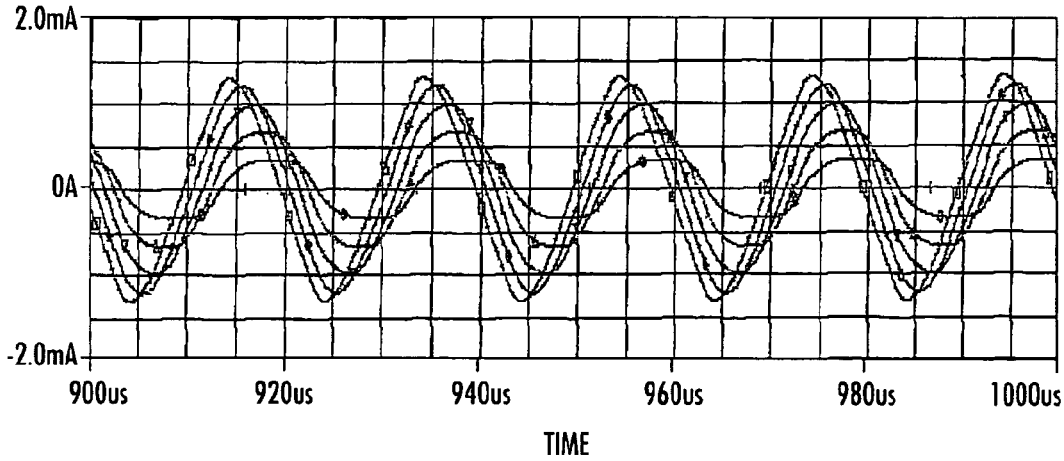

The waveform diagrams of FIGS. 3 and 4 also depict that for incremental phase offsets between the two extreme values of 0° and 180°, the two waveforms produced by push-pull DC-AC converter stages 100 and 200 are incrementally offset in phase, which serves to vary or modulate the amplitude of the composite waveform produced across output terminals 101 and 201. In accordance with a non-limiting, but preferred embodiment of the invention, producing the incremental phase offsets between the two waveforms generated by stages 100 and 200 is readily accomplished by imparting a controlled amount of delay to the pulse trains produced by pulse generators 210 and 250 relative to the pulse trains produced by pulse generators 110 and 150. Namely, the pulse train output produced by pulse generator 210 is controllably delayed relative to the pulse train produced by pulse generator 110, while the pulse train output produced by pulse generator 250 is controllably delayed by the same amount relative to the pulse train produced by pulse generator 210. The amount of delay between these two pulse trains will control the shape and thereby the amplitude of the composite AC waveform produced across output ports 101 and 201.

Figure 5:
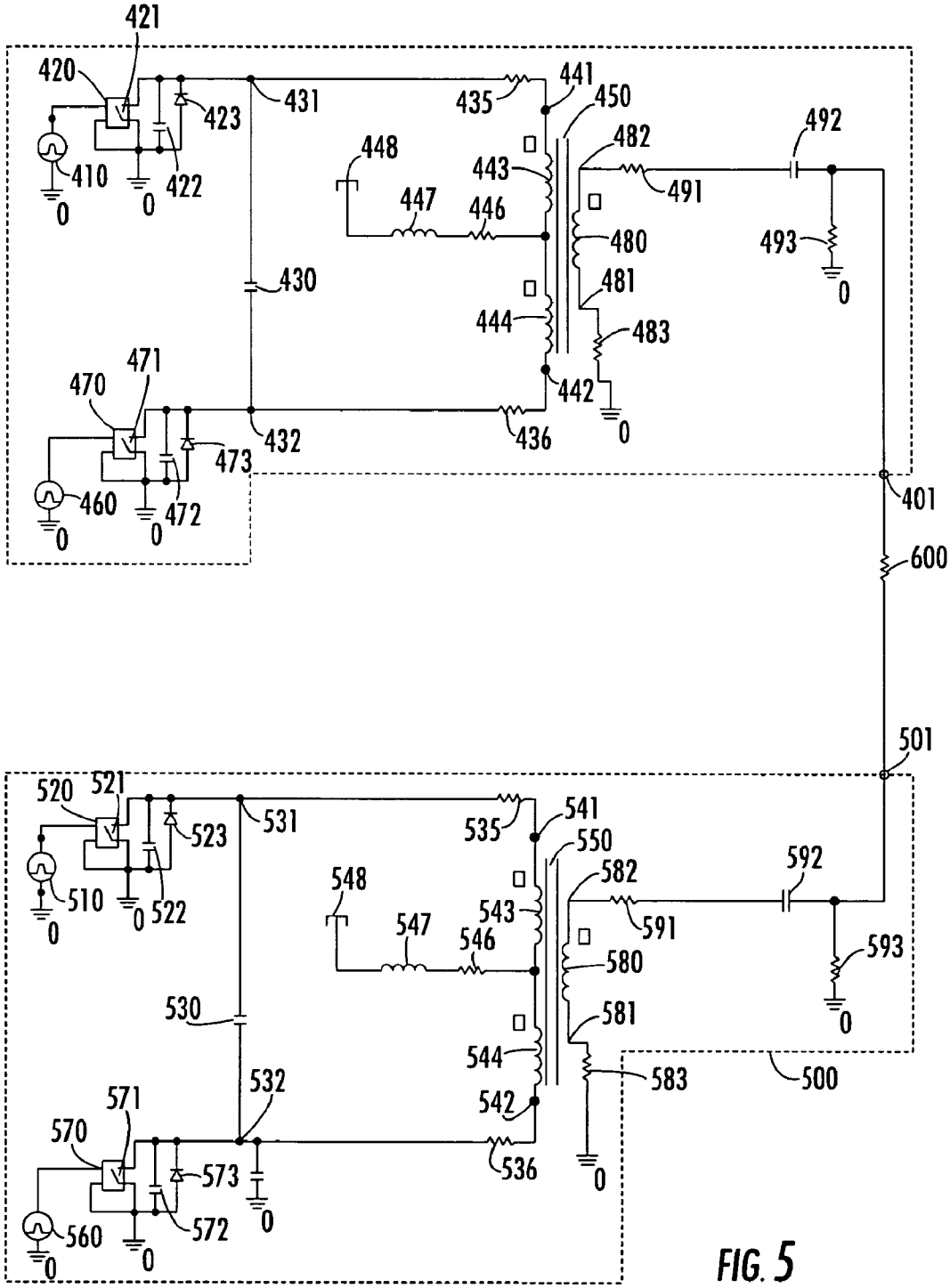
FIG. 5 diagrammatically illustrates second, current-fed embodiment of a DC-AC controller and driver architecture for a double-ended inverter arrangement for powering a load such as a cold cathode fluorescent lamp in accordance with the present invention.

Attention is now directed to FIG. 5, wherein a second embodiment of the present invention, in particular, a current-fed, double-ended, push-pull DC-AC converter, is schematically illustrated as comprising first and second, current-fed, push-pull DC-AC converter stages 400 and 500, respective output ports 401 and 501 of which are coupled to opposite ends of a load 600, such as but not limited to a CCFL, as in the first embodiment. As in the first embodiment, the current-fed, double ended push-pull, DC-AC converter stages 400 and 500 are operative to produce first and second sinusoidal voltages having the same frequency and amplitude, but having a controlled phase difference therebetween, which is effective to modulate the amplitude of the composite AC voltage produced across the opposite ends of the load.

For this purpose, the first, current-fed, push-pull DC-AC converter stage 400 comprises a first pulse generator 410, which produces an output pulse signal having a 50% duty cycle. This rectangular wave signal is applied to the control terminal of a controlled switching device, shown as a controlled relay 420, having a controllably interruptible current flow path 421 therethrough coupled between a prescribed reference voltage (e.g., ground) and a first end 431 of a capacitor 430. Capacitor 430 and the inductance of a primary winding 440 of a step-up transformer 450 form a resonant tank circuit, that serves to deliver a resonant sinusoidal waveform of a fixed frequency and amplitude to the output winding 480 of the transformer, as will be described.

A capacitor 422 and a diode 423 are coupled across the terminals of relay 420. The first end 431 of capacitor 430 is coupled through a resistor 435 to a first end 441 of an upper half 443 of a center-tapped primary coil 440 of a step-up transformer 450. Push-pull DC-AC converter stage 400 further includes a second pulse generator 460, which also produces an output pulse signal having a 50% duty cycle. In accordance with the invention, the 50% duty cycle, rectangular wave output of pulse generator 460 has the same frequency and amplitude as, but opposite phase relative to, the rectangular wave signal output of pulse generator 410.

The rectangular wave signal output of pulse generator 460 is applied to the control terminal of a second controlled switching device 470, shown as a controlled relay, having the controlled current flow path 471 therethrough coupled between a prescribed reference voltage (e.g., ground) and a second end 432 of capacitor 430. A capacitor 472 and a diode 473 are coupled across the terminals of relay 470. The second end 432 of capacitor 430 is coupled through a resistor 436 to a second end 442 of a lower half 444 of the center-tapped primary winding 440 of transformer 450. With the signals produced by pulse generators 410 and 460 having the same amplitude and frequency, but being of opposite phase, then whenever switch 420 is closed, switch 470 is opened, and whenever switch 420 is opened, switch 470 is closed.

The primary 440 of step-up transformer 450 has its center tap 445 coupled through a resistor 446 and an inductor 447 to a DC voltage source 448 (e.g., a 24 volt battery) which serves as the current feed for the DC-AC converter. Transformer 450 has a first end 481 of a secondary coil 480 coupled through a resistor 483 to a reference voltage (e.g., ground); a second end 482 of secondary coil 480 is coupled by way of an RC output filter circuit 490, which includes resistor 491, capacitor 492 and resistor 493 to the first output port 401. As pointed out above, output port 401 is adapted to be coupled to one end of a high voltage load 600, such as a CCFL.

The operation of the first push-pull DC-AC converter stage 400 is as follows. The complementary phase, rectangular waveform 50% duty cycle output pulse trains produced by pulse generators 410 and 460 will alternately close and open switches 420 and 470, such that switch 420 will be closed, while switch 470 is open, and switch 420 will be open, while switch 470 is closed. Whenever switch 420 is closed, a current flow path is established from the battery terminal 448 though inductor 447 and resistor 446 to the center tap 445 of the transformer's primary winding 440, and therefrom through the upper half coil 443, resistor 435 and the closed current flow path 421 to ground through switch 420. A prescribed time thereafter (e.g., ten microseconds, as a non-limiting example) the states of the two pulse signal inputs to the control inputs of switches 420 and 470 are reversed. This causes switch 420 to open and switch 470 to close. Due to the inductance of the upper portion 443 of the transformer's primary winding, current therethrough does not immediately cease flowing. Instead, with the current flow path 421 of switch 420 being interrupted, current from the upper primary winding 443 flows into the upper side of capacitor 430.

With switch 470 closed, a current flow path is established from the battery terminal 448 though inductor 447 and resistor 446 to the center tap 445 of the transformer's primary winding 440, and therefrom through the lower primary coil 443, resistor 436 and the closed current flow path 471 to ground through switch 470. A prescribed time thereafter, the states of the two pulse signal inputs to switches 420 and 470 are reversed, causing switch 420 to close and switch 470 to open. Due to the inductance of the lower portion 444 of the transformer's primary winding 440, current flows into capacitor 430 from the second end 432. The resonant circuit formed by capacitor 430 and the primary 440 of transformer 450 results in a ringing of the current between the capacitor 430 and the primary winding 440 of the transformer 450, which serves to induce a sinusoidal waveform across the secondary winding 480. While switch 420 is open and switch 470 is closed, a half sine waveform appears on the open switch (420) and on the 'dotted' end of the primary winding (node 441) and a positive half sine waveform on the 'dotted' end of the secondary (node 482). When the states of the switches reverse (i.e. 420 is closed and 470 is open) a half sine waveform appears on switch 470 and on the 'non-dotted' end of the primary winding (node 442) and a negative half sine wave form on the 'dotted' end of the transformer secondary (node 442). The resultant of the two one-half sine waves, which is applied to the first output port 401, is a sine wave of fixed amplitude, frequency and phase, as shown in the waveform diagram of FIG. 6.

As in the case of the voltage-fed, push-pull converter shown in FIG. 1, the second push-pull DC-AC converter stage 500 of the current-fed, push-pull converter shown in FIG. 5 is configured identically to the converter stage 400. More particularly, current-fed converter stage 500 comprises a first pulse generator 510, which produces an output pulse signal having a 50% duty cycle. This rectangular waveform is applied to the control terminal of a switching device 520, having a controllably interruptible current flow path 521 coupled between a prescribed reference voltage (e.g., ground) and a first end 531 of a capacitor 530. As in the case of converter stage 400, capacitor 530 and the inductance of a primary winding 540 of a step-up transformer 550 form a resonant tank circuit, that serves to deliver a resonant sinusoidal waveform of a fixed frequency and amplitude to the output winding 580 of the transformer.

A capacitor 522 and a diode 523 are coupled across the terminals of switch 520. The first end 531 of capacitor 530 is coupled through a resistor 535 to a first end 541 of an upper half 543 of a center-tapped primary coil 540 of a step-up transformer 550. Push-pull DC-AC converter stage 500 further includes a second pulse generator 560, which also produces an output pulse signal having a 50% duty cycle. In accordance with the invention, the 50% duty cycle, rectangular wave output of pulse generator 560 has the same frequency and amplitude as, but opposite phase relative to, the rectangular wave signal output of pulse generator 510.

The rectangular wave signal output of pulse generator 560 is applied to the control terminal of a second controlled switching device 570, having a controlled current flow path 571 therethrough coupled between a prescribed reference voltage (e.g., ground) and a second end 532 of capacitor 530. A capacitor 572 and a diode 573 are coupled across the terminals of relay 570. The second end 532 of capacitor 530 is coupled through a resistor 536 to a second end 542 of a lower half 544 of the center-tapped primary winding 540 of transformer 550. With the signals produced by pulse generators 510 and 560 having the same amplitude and frequency, but being of opposite phase, then whenever switch 520 is closed, switch 570 is opened, and whenever switch 520 is opened, switch 570 is closed.

The primary 540 of step-up transformer 550 has its center tap 545 coupled through a resistor 546 and an inductor 547 to a DC voltage source 548 (e.g., a 24 volt battery) which serves as the current feed for the DC-AC converter. Transformer 550 has a first end 581 of a secondary coil 580 coupled through a resistor 583 to a reference voltage (e.g., ground); a second end 582 of secondary coil 580 is coupled by way of an RC output filter circuit 590, which includes resistor 591, capacitor 592 and resistor 593 to the second output port 501. As pointed out above, output port 501 is adapted to be coupled to the other end of high voltage load 600.

Figure 6:
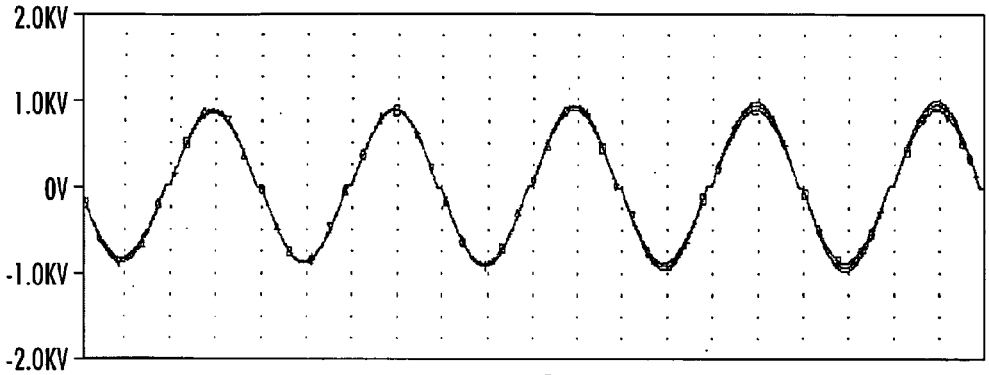
FIGS. 6-8 is a set of voltage waveforms associated with the operation of the embodiment of the invention depicted in FIG. 5.
Figure 7:
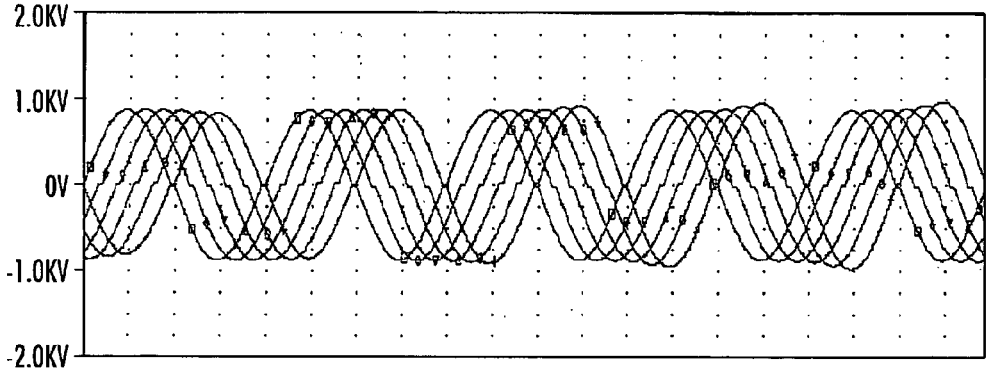
Figure 8:
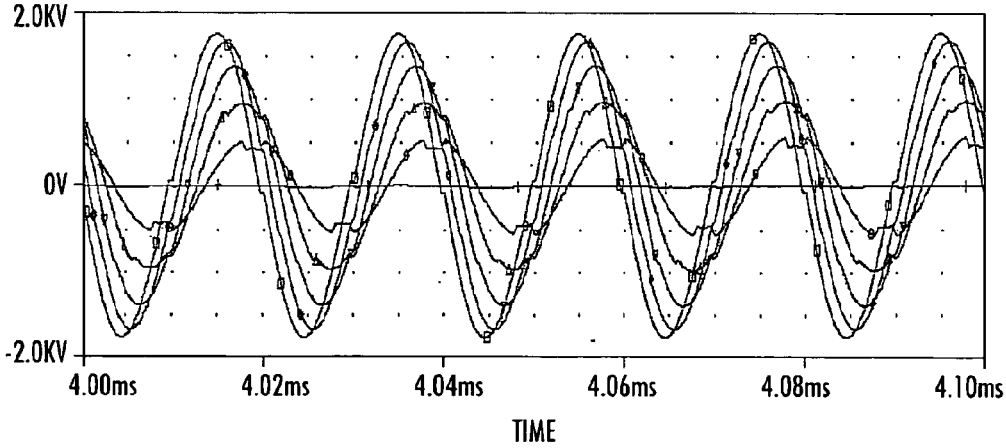

The operation of the push-pull DC-AC converter stage 500 is the same as that of push-pull DC-AC converter stage 400, except that the transitions in the complementary 50% duty cycle pulse trains produced by pulse generators 510 and 560 are controllably incrementally delayed with respect to the pulse trains produced by pulse generators 410 and 460, respectively, so as to controllably shift the phase of the resultant sine wave supplied to the second output port 502. The effect of a plurality of such mutually offset time delays is diagrammatically illustrated in FIG. 7, as an associated set of sinusoidal waveforms, having phases with respect to the sine waveform of FIG. 6 are mutually offset between 0° and 180°. As in the voltage-fed embodiment of FIG. 1, incrementally offsetting in phase the two sine waveforms produced by the push-pull DC-AC converter stages 400 and 500 of the current-fed embodiment of FIG. 5 serves to vary or modulate the amplitude of the composite waveform produced across output terminals 401 and 501, as shown in the waveform diagram of FIG. 8.

Figure 9:
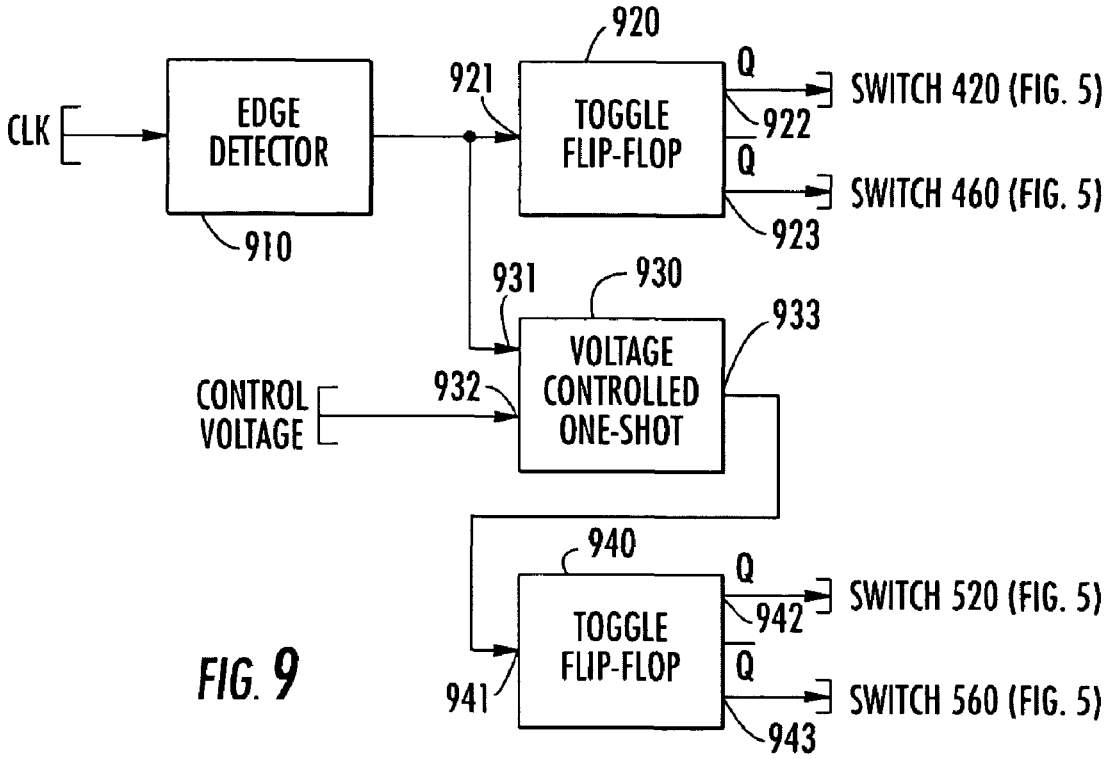
FIG. 9 diagrammatically illustrates an example of a voltage controlled delay circuit that may be used to define the relative delay between the complementary pulse trains that are applied to pulse generators of the embodiments of the double-ended, push-pull inverters of the present invention.

FIG. 9 diagrammatically illustrates a non-limiting example of a voltage controlled delay circuit that may be used to define the relative delay between the complementary pulse trains that are applied to the pulse generators within the respective push-pull DC-AC converter stages of the embodiments of the invention, described above, and thereby control the amplitude of the composite AC waveform produced across the driven load. As shown therein, the voltage controlled delay circuit comprises an edge detector 910, which is coupled to receive a digital clock signal of a prescribed frequency associated with the intended operation of the DC-AC converter. The output of edge detector 910 is coupled to the toggle input 921 of a first toggle flip-flop 920 and to an edge input 931 of a voltage controlled monostable-multivibrator or one-shot 930. For the embodiment of the invention shown in FIG. 1, toggle flip-flop 920 has its Q and QBAR outputs 922 and 923 respectively coupled to the gate inputs of MOSFETs 120 and 160. For the embodiment of the invention shown in FIG. 5, toggle flip-flop 920 has its Q and QBAR outputs 922 and 923 respectively coupled to the switch control inputs of switches 420 and 460.

One-shot 930 has a voltage control input 932, which is coupled to receive a DC voltage that sets the delay through the one-shot, as referenced to the signal edge applied to edge input 931. The output 933 of one-shot 930 is thereby a replication of the edge signal produced by edge detector 910, but delayed in time in proportion to the magnitude of the DC voltage applied to voltage control input 932. The output 933 of the one-shot is coupled to the toggle input 941 of a toggle flip-flop 940. For the embodiment of the invention shown in FIG. 1, toggle flip-flop 940 has its Q and QBAR outputs 942 and 943 respectively coupled to the gate inputs of MOSFETs 220 and 260. For the embodiment of the invention shown in FIG. 5, toggle flip-flop 940 has its Q and QBAR outputs 942 and 943 respectively coupled to the switch control inputs of switches 520 and 560.

Incrementally varying the magnitude of the DC voltage applied to the voltage control input 932 of one-shot 930 serves to controllably adjust the delay between the transitions in the complementary 50% duty cycle pulse trains produced by pulse generators 510 and 560 with respect to the pulse trains produced by pulse generators 410 and 460, respectively, so as to controllably shift the phase of the resultant sine wave supplied to the second output port 502 of FIG. 5. As described above, the effect of a plurality of such mutually offset time delays is diagrammatically illustrated in FIG. 7, as an associated set of sinusoidal waveforms, having phases that are mutually offset with respect to the sine waveform of FIG. 6.

As will be appreciated from the foregoing description, disadvantages of conventional high voltage AC power supply system architectures, including systems for supplying AC power to CCFLs used to back-light an LCD panel, are effectively obviated by *systems such as that in FIG. 10 having display 1004 and having* the double-ended, push-pull DC-AC converter architecture of the present invention, which is operative to drive opposite ends of a load, such as a CCFL *1006*, with a first and second sinusoidal voltages having the same frequency and amplitude, but having a controlled phase difference therebetween. By controlling the phase difference between the first and second sinusoidal voltages, the present invention is able to vary the amplitude of the composite voltage differential produced across the opposite ends of the load.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An apparatus for supplying AC power to a high voltage load comprising first and second push-pull DC-AC converter stages which are operative to drive opposite ends of said load with first and second sinusoidal voltages having the same frequency and amplitude, but having a controlled phase difference therebetween, which is effective to vary the amplitude of the composite AC voltage differential produced across the opposite ends of said load.

2. The apparatus according to claim 1, wherein a respective converter stage contains a pair of pulse generators which generate phase-complementary pulse signals of the same amplitude and frequency, and having a 50% duty cycle, said phase-complementary pulse signals being used to control ON/OFF conduction of a pair of controlled switching devices, current flow paths through which are coupled between a reference voltage terminal and opposite ends of a voltage-fed center-tapped primary coil of a step-up transformer, said step-up transformer having a secondary coil thereof coupled to a resonant filter circuit that is operative to convert a generally rectangular wave output produced across the secondary winding of the step-up transformer into a generally sinusoidal waveform.

3. The apparatus according to claim 2, wherein the phase of the sinusoidal waveform produced by the resonant filter circuit of one of said converter stages is controllably shifted by a prescribed amount relative to the phase of the sinusoidal waveform produced by the resonant filter circuit of another converter stage, so as to modify the amplitude of the composite AC voltage differential produced between said opposite ends of said load.

4. The apparatus according to claim 3, further comprising a voltage-controlled delay circuit which is operative to impart a controlled amount of delay to pulse trains produced by pulse generators of said one of said converter stages relative to the pulse trains produced by pulse generators of said another of said converter stages, said controlled amount of delay between the two pulse trains controlling the amplitude of the composite AC voltage differential produced across the opposite ends of the load.

5. The apparatus according to claim 1, wherein a respective converter stage contains a pair of pulse generators which generate phase-complementary pulse signals of the same amplitude and frequency, and having a 50% duty cycle, said phase-complementary pulse signals being used to control ON/OFF conduction of a pair of controlled switching devices, current flow paths through which are coupled between a reference voltage terminal and opposite ends of a current-fed, center-tapped primary coil of a step-up transformer, said primary coil being coupled with a capacitor, so as to form a resonant tank circuit therewith, said step-up transformer having a secondary coil that is operative to produce a generally sinusoidal waveform.

6. The apparatus according to claim 5, wherein the phase of the sinusoidal waveform produced by the secondary coil of the step-up transformer of one of said converter stages is controllably shifted by a prescribed amount relative to the phase of the sinusoidal waveform produced by secondary coil of the step-up transformer of another of said converter stages, and thereby modify the amplitude of the composite AC voltage differential produced between said opposite ends of said load.

7. The apparatus according to claim 6, further comprising a voltage-controlled delay circuit which is operative to impart a controlled amount of delay to pulse trains produced by pulse generators of said one of said converter stages relative to the pulse trains produced by pulse generators of said another of said converter stages, said controlled amount of delay between the two pulse trains controlling the amplitude of the composite AC voltage differential produced across the opposite ends of the load.

8. The apparatus according to claim 1, wherein said load comprises a cold cathode fluorescent lamp.

9. The apparatus according to claim 1, wherein said first and second push-pull DC-AC converter stages include respective first and second resonant filter circuits which are operative to convert first and second generally rectangular wave voltages produced by said first and second push-pull DC-AC converter stages to said first and second sinusoidal voltages.

10. A method for supplying AC power to a high voltage load comprising the steps of:

(a) providing first and second push-pull DC-AC converter stages which are operative to produce first and second sinusoidal voltages having the same frequency and amplitude, but having a controllable phase difference therebetween;

(b) driving opposite ends of said load with said first and second sinusoidal voltages; and (c) controlling the phase difference between said first and second sinusoidal voltages, so as to modify the voltage differential between said first and second sinusoidal voltages applied to said opposite ends of said load;

*wherein controlling the phase difference comprises applying a delay to pulse trains produced by pulse generators of one of the push-pull DC-AC converter stages relative to pulse trains produced by pulse generators of the other push-pull DC-AC converter stage.*

11. The method according to claim 10, wherein a respective one of said first and second push-pull DC-AC converter stages contains a pair of pulse generators which generate phase-complementary pulse signals of the same amplitude and frequency, and having a 50% duty cycle, said phase-complementary pulse signals controlling ON/OFF conduction of a pair of controlled switching devices, current flow paths through which are coupled between a reference voltage terminal and opposite ends of a voltage-fed center-tapped primary coil of a step-up transformer, said step-up transformer having a secondary coil thereof coupled to a resonant filter circuit that is operative to convert a generally rectangular wave output produced across the secondary winding of the step-up transformer into a generally sinusoidal waveform for application to a respective end of said load.

12. The method according to claim 11, wherein step (c) comprises controllably shifting the phase of the sinusoidal waveform produced by the resonant filter circuit of one of said converter stages by a prescribed amount relative to the phase of the sinusoidal waveform produced by the resonant filter circuit of another converter stage, so as to modify the amplitude of the composite AC voltage differential produced between said opposite ends of said load.

13. The method according to claim 12, wherein step (c) comprises imparting a controlled amount of delay to pulse trains produced by pulse generators of said one of said converter stages relative to the pulse trains produced by pulse generators of said another of said converter stages, said controlled amount of delay between the two pulse trains being effective to control the amplitude of the composite AC voltage differential produced across the opposite ends of the load.

14. The method according to claim 10, wherein a respective converter stage contains a pair of pulse generators which generate phase-complementary pulse signals of the same amplitude and frequency, and having a 50% duty cycle, said phase-complementary pulse signals being used to control ON/OFF conduction of a pair of controlled switching devices, current flow paths through which are coupled between a reference voltage terminal and opposite ends of a current-fed, center-tapped primary coil of a step-up transformer, said primary coil being coupled with a capacitor, so as to form a resonant tank circuit therewith, said step-up transformer having a secondary coil that is operative to produce a generally sinusoidal waveform for application to a respective end of said load.

15. The method according to claim 14, wherein step (c) comprises controllably shifting the phase of the sinusoidal waveform produced by the secondary coil of the step-up transformer of one of said converter stages by a prescribed amount relative to the phase of the sinusoidal waveform produced by secondary coil of the step-up transformer of another of said converter stages, thereby modifying the amplitude of the composite AC voltage differential produced between said opposite ends of said load.

16. The method according to claim 15, wherein step (c) further comprises imparting a controlled amount of delay to pulse trains produced by pulse generators of said one of said converter stages relative to the pulse trains produced by pulse generators of said another of said converter stages, said controlled amount of delay between the two pulse trains controlling the amplitude of the composite AC voltage differential produced across the opposite ends of the load.

17. The method according to claim 10, wherein said load comprises a cold cathode fluorescent lamp.

18. The method according to claim 10, wherein said first and second push-pull DC-AC converter stages include respective first and second resonant filter circuits which are operative to convert first and second generally rectangular wave voltages produced by said first and second push-pull DC-AC converter stages to said first and second sinusoidal voltages.

19. An apparatus for supplying AC power to a high voltage load comprising: first means for driving a first end of said load with a first sinuosoidal AC voltage derived from a DC input voltage; second means for driving a second end of said load with a second sinuosoidal AC voltage derived from a DC input voltage, said second sinuosoidal AC voltage having the same frequency and amplitude as said first sinusoidal AC voltage; and third means for controlling the phase difference between said first and second sinusoidal AC voltages, so as to vary the amplitude of the composite AC voltage differential produced across said first and second ends of said load.

20. The apparatus according to claim 19, wherein each of said first and second means comprises a pair of pulse generators which generate phase-complementary pulse signals of the same amplitude and frequency, and having a 50% duty cycle, said phase-complementary pulse signals being used to control ON/OFF conduction of a pair of controlled switching devices, current flow paths through which are coupled between a reference voltage terminal and opposite ends of a voltage-fed center-tapped primary coil of a step-up transformer, said step-up transformer having a secondary coil thereof coupled to a resonant filter circuit that is operative to convert a generally rectangular wave output produced across the secondary winding of the step-up transformer into a generally sinusoidal AC waveform.

21. The apparatus according to claim 20, wherein said third means is operative to controllably shift the phase of the sinusoidal waveform produced by the resonant filter circuit of one of said first and second means by a prescribed amount relative to the phase of the sinusoidal waveform produced by the resonant filter circuit of the other of said first and second means, so as to modify the amplitude of the composite AC voltage differential produced between said first and second ends of said load.

22. The apparatus according to claim 21, further comprising a voltage-controlled delay circuit which is operative to impart a controlled amount of delay to pulse trains produced by pulse generators of said one of said first and second means relative to the pulse trains produced by pulse generators of said other of said first and second means, said controlled amount of delay between the two pulse trains controlling the amplitude of the composite AC voltage differential produced across the first and second ends of the load.

23. The apparatus according to claim 19, wherein each of said first and second means comprises a pair of pulse generators which generate phase-complementary pulse signals of the same amplitude and frequency, and having a 50% duty cycle, said phase-complementary pulse signals being used to control ON/OFF conduction of a pair of controlled switching devices, current flow paths through which are coupled between a reference voltage terminal and opposite ends of a current-fed, center-tapped primary coil of a step-up transformer, said primary coil being coupled with a capacitor, so as to form a resonant tank circuit therewith, said step-up transformer having a secondary coil that is operative to produce a generally sinusoidal AC waveform.

24. The apparatus according to claim 23, wherein said third means comprises means for controllably shifting the phase of the sinusoidal waveform produced by the secondary coil of the step-up transformer of one of said first and second means by a prescribed amount relative to the phase of the sinusoidal waveform produced by secondary coil of the step-up transformer of the other of said first and second means, and thereby modify the amplitude of the composite AC voltage differential produced between said first and second ends of said load.

25. The apparatus according to claim 24, wherein said third means comprise a voltage-controlled delay circuit which is operative to impart a controlled amount of delay to pulse trains produced by pulse generators of said one of said first and second means relative to the pulse trains produced by pulse generators of the other of said first and second means, said controlled amount of delay between the two pulse trains controlling the amplitude of the composite AC voltage differential produced across said first and second ends of the load.

26. The apparatus according to claim 19, wherein said load comprises a cold cathode fluorescent lamp.

27. The apparatus according to claim 19, wherein said first means is operative to produce a first generally rectangular wave voltage and includes a first resonant filter circuit which is operative to convert said first generally rectangular wave voltage to said first sinusoidal AC voltage, and said second means is operative to produce a second generally rectangular wave voltage and includes a second resonant filter circuit which is operative to convert said second generally rectangular wave voltage to said second sinusoidal AC voltage.

28. A method for supplying AC power to a high voltage load comprised in the steps of:

(a) driving opposite ends of said high voltage load with first and second sinusoidal voltages having the same frequency and amplitude, but a controllable phase difference therebetween; and (b) controlling the phase difference between said first and second sinusoidal voltages, so as to modify the peak voltage differential between said first and second sinusoidal voltages applied to said opposite ends of said load*;*

*wherein controlling the phase difference comprises applying a delay to pulse trains produced by pulse generators of one DC-AC converter stage coupled to one end of the high voltage load relative to pulse trains produced by pulse generators of another DC-AC converter stage coupled to an opposite end of the high voltage load.*

29. The method according to claim 28, wherein step (a) comprises providing first and second DC-AC converter stages which are operative to produce first and second generally rectangular [way] *wave* voltages, and which include respective first and second resonant filter circuits that are operative to convert said first and second generally rectangular wave voltages to said first and second sinusoidal voltages.

*30. An apparatus for supplying AC power to a high voltage load comprising first and second converter stages which are operative to drive opposite ends of said load with first and second sinusoidal voltages having the same frequency and amplitude, but having a controlled phase difference therebetween, which is effective to vary the amplitude of the composite AC voltage differential produced across the opposite ends of said load.*

*31. The apparatus according to claim 30, wherein each of the first and second converter stages contains a pair of pulse generators which generate phase-complementary pulse signals of the same amplitude and frequency, and having a 50% duty cycle, said signals controlling a pair of switching devices, the current flow paths between said switches through*

*which is coupled a center-tapped primary coil of a step-up transformer, said transformer having a secondary coil coupled to a resonant filter circuit that is operative to convert a generally rectangular wave output into a generally sinusoidal waveform.*

*32. The apparatus according to claim 31, wherein the phase of the generally sinusoidal waveform produced by one converter stage is shifted by a prescribed amount relative to the phase of the sinusoidal waveform produced by the other converter stage, so as to modify the amplitude of the voltage differential across said load.*

*33. The apparatus according to claim 32, further comprising a voltage-controlled delay circuit which is operative to impart a controlled amount of delay to pulse trains of one of said converter stages relative to the pulse trains of the other of said converter stages, said delay controlling the amplitude of the AC voltage differential produced across the opposite ends of the load.*

*34. The apparatus according to claim 30, wherein each of the first and second converter stages contains a pair of pulse generators which generate phase-complementary pulse signals of the same amplitude and frequency, and having a 50% duty cycle, said signals controlling a pair of switching devices, the current flow paths between said switches through which is coupled a center-tapped primary coil of a step-up transformer, said primary coil being coupled with a capacitor to form a resonant tank circuit, said step-up transformer having a secondary coil that is operative to produce a generally sinusoidal waveform.*

*35. The apparatus according to claim 34, wherein the phase of the sinusoidal waveform produced by the secondary coil of the step-up transformer of one of said converter stages is controllably shifted by a prescribed amount relative to the phase of the sinusoidal waveform produced by secondary coil of the step-up transformer of another of said converter stages, thereby modifying the amplitude of the AC voltage differential produced between said opposite ends of said load.*

*36. The apparatus according to claim 35, further comprising a voltage-controlled delay circuit which is operative to impart a controlled amount of delay to pulse trains of one of said converter stages relative to the pulse trains of the other of said converter stages, said delay controlling the amplitude of the AC voltage differential produced across the opposite ends of the load.*

*37. A method for supplying AC power to a high voltage load comprising:*

*producing first and second sinusoidal voltages having the same frequency and amplitude;*

*driving opposite ends of said load with said first and second sinusoidal voltages; and*

*controlling the phase difference between said first and second sinusoidal voltages, so as to modify the voltage difference between said first and second sinusoidal voltages applied to said opposite ends of said load;*

*wherein controlling the phase difference comprises applying a delay to pulse trains produced by pulse generators of one DC-AC converter stage coupled to one end of the high voltage load relative to pulse trains produced by pulse generators of another DC-AC converter stage coupled to an opposite end of the high voltage load.*

*38. The method according to claim 37 wherein the first and second sinusoidal voltages are converted in a first and second converter stage from a first and second rectangular waveform.*

*39. The method according to claim 38 wherein the first and second converter stage each contain a step-up transformer the secondary coil of which is coupled to a resonant filter circuit which is operative to convert the first and second rectangular waveform to the first and second sinusoidal waveform.*

*40. The method according to claim 38 wherein the phase difference is controlled by shifting the generally sinusoidal waveform produced by one converter stage by a prescribed amount relative to the phase of the sinusoidal waveform produced by the other converter stage, so as to modify the amplitude of the voltage differential across said load.*

*41. A system comprising:*

*a liquid crystal display;*

*a high-voltage cold cathode fluorescent lamp operative to provide backlighting to the liquid crystal display;*

*an apparatus for supplying AC power to the cold cathode fluorescent lamp, comprising first and second converter stages which are operative to drive opposite ends of the cold cathode fluorescent lamp with first and second sinusoidal voltages having a controlled phase difference therebetween, the controlled phase difference effective to vary the amplitude of the composite AC voltage differential produced across the opposite ends of the cold cathode fluorescent lamp.*

*42. The system according to claim 41, wherein each of the first and second converter stages contains a pair of pulse generators which generate rectangular waves of 50% duty cycle, the rectangular waves controlling a pair of switching devices between which is coupled a center-tapped step-up transformer, a resonant filter circuit coupled to the secondary coil of the center-tapped step-up transformer operative to convert the rectangular wave to a sinusoidal waveform.*

*43. The system according to claim 42, wherein the phase of the sinusoidal waveform produced by one of said converter stages is controllably shifted by a prescribed amount relative to the phase of the sinusoidal waveform produced by secondary coil of the step-up transformer of another of said converter stages, thereby modifying the amplitude of the AC voltage differential produced between said opposite ends of said cold cathode fluorescent lamp.*

*44. The system according to claim 43, wherein a voltage delay circuit is operative to impart a controlled amount of delay, the delay controlling the amount of the shift between the phase of the sinusoidal waveform produced by one converter stage relative to the sinusoidal waveform of the other converter stage.*

* * * * *